June 3, 1930.  G. K. BECKETT  1,761,463
FISHING TOOL
Filed Oct. 10, 1928   2 Sheets-Sheet 1
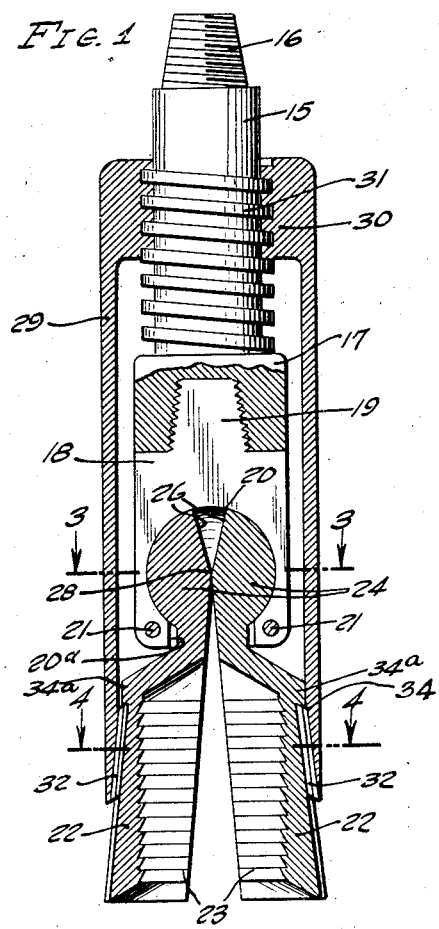
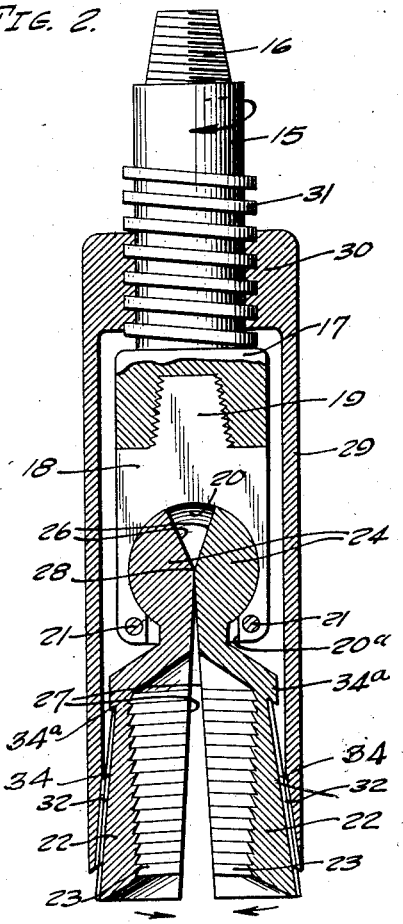
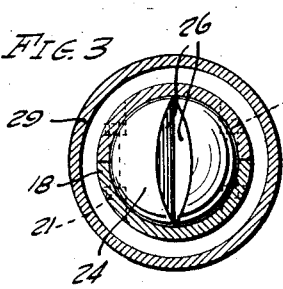
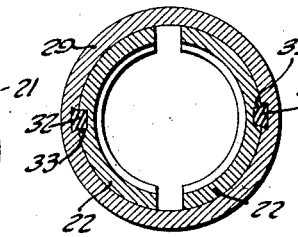
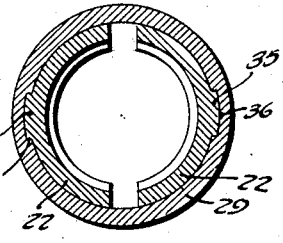
INVENTOR
G. K. BECKETT
BY Munn & Co.
ATTORNEY June 3, 1930.  G. K. BECKETT  1,761,463
FISHING TOOL
Filed Oct. 10, 1928  2 Sheets-Sheet 2
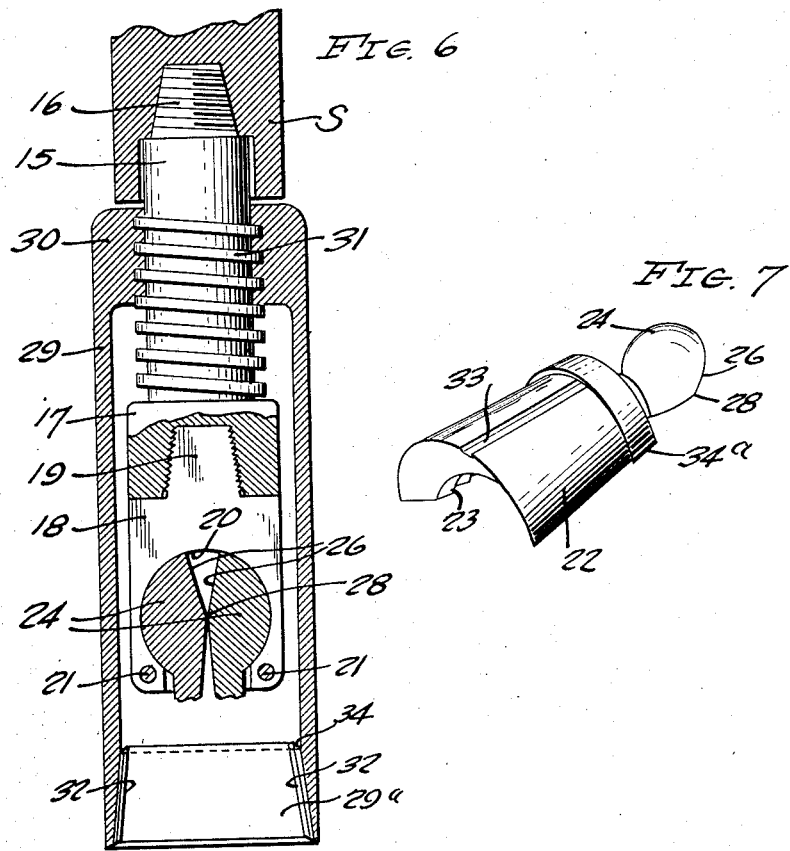

Patented June 3, 1930

1,761,463

UNITED STATES PATENT OFFICE

GOVENOR K. BECKETT, OF BAKERSFIELD, CALIFORNIA

FISHING TOOL

Application filed October 10, 1928. Serial No. 311,644.

My invention relates to fishing tools for use in oil and gas wells, and it has particular reference to tools for removing from wells the obstructions, broken or lost parts of rotary bits, and other tools used in rotary drilling.

It is a purpose of my invention to provide a fishing tool possessing structural simplicity, durability, and low cost of manufacture, and which is adapted for association and operation by a rotary drill pipe to receive and hold a rotary bit or any part thereof, or any other object lost in a well, in such manner that by removal of the drill pipe the tool or other object may be recovered.

I will describe only one form of fishing tool embodying my invention and will then point out the novel features in claims.

In the accompanying drawings:

Figure 1 is a view showing in vertical section one form of finishing tool embodying my invention, the tool being in object-receiving or non-holding position;

Fig. 2 is a view similar to Fig. 1 showing the tool in object-holding position;

Figs. 3 and 4 are transverse sectional views taken on the lines 3—3 and 4—4, respectively, of Fig. 1;

Fig. 5 is a view similar to Fig. 4 showing a modified form of connection between the actuating shoe and the slips of the grab device;

Fig. 6 is a view similar to Fig. 1 with the jaws broken away to reveal the interior construction of the shoe; and Fig. 7 is a view showing one of the jaws in perspective.

In carrying out my invention, I provide a stem 15 formed at its upper end with a pin 16 adapted for connection within the box at the lower end of a rotary drill pipe or sub S in order that the tool as a unit may be operated by rotation of the drill pipe. At its lower end the stem 15 is formed with a head 17 of larger diameter than the remainder of the stem, and this head is connected to a bushing 18 by means of a pin and box connection 19. The split bushing 18 is formed, in the present instance, of two identical sections recessed on their inner faces at corresponding points so that when assembled the recesses coact to produce a spherical socket 20, in which a ball head is adapted to be received. Bolts 21 extend through the lower end of the bushing 18 for clamping the two sections together to retain the ball head therein, and to align the threads of the pin 19 so that it may be readily inserted into the box of the head 17.

My invention also includes what I term a grab device comprising in the present instance two slips or jaws 22 each of substantially semi-circular form, as shown in Fig. 4, but tapered in thickness, as shown in Fig. 1, in order to produce a wedging action under the influence of an actuating shoe. The confronting faces of the jaws are formed with outwardly extending teeth 23, in order that when an object is inserted between the jaws the latter are moved to a gripping or holding position, as illustrated in Fig. 2, the object being held against displacement from the jaws and the internal diameter of the device decreased toward its lower end to increase its holding action in respect to the object.

The upper ends of the jaws are formed with head sections 24 which coact to provide a substantially spherical head adapted to rotate within the socket 20, and to thereby provide a swivel mounting for the jaws in order that they may have a hinged movement to occupy open and closed positions, and yet may rotate with respect to the bushing. It will be understood that the head sections 24 project upwardly from a neck portion 25 which extends through the mouth 20ª of the socket 20. The diameter of the neck in respect to the mouth is such that the jaws are free to occupy open and closed positions.

By reference to Figs. 1 and 2, the precise contour of the head sections 24, to permit hinged movement of the jaws 22 to allow them to occupy open and closed positions, will be apparent. As shown, the confronting faces of the head sections 24 are formed with surfaces 26 and 27 which recede from their point of connection indicated at 28, the recession of the surfaces 26 being more abrupt than that of the surfaces 27, and the surfaces 27 being in effect a continuation of the confronting edges of the jaws 22. This construction causes the head sections 24, under opening or closing movement of the jaws 22, to swing in the socket 20 about the point 28 as a center so that it may be said that the jaws have a hinged movement about the axis 28 as a center. It will be understood that this hinged movement is independent of any bodily movement of the jaws in which the head 24, as a unit, rotates within the socket 20 and about a vertical axis.

The mounting of the jaws 22 is such that under the action of gravity they normally occupy an open position as illustrated in Fig. 1, and in which position the object to be recovered is adapted to be inserted between the jaws by lowering of the tool onto the object.

The jaws are adapted to be moved to what is termed a closed or holding position through the actuation of a shoe 29 provided with a hub 30 threaded interiorly to engage the threads 31 on the stem 15. As shown in Fig. 6, the shoe is of tubular form and its lower end, which is open, is of frusto-conical form on the inner side thereof, as indicated at 29ª, and is tapered toward its free edge in order that it may present a surface parallel to the outer periphery of the jaws 22. The surface of this frusto-conical portion is formed with grooves in which tongues or keys 32 are secured to slide within grooves 33 in the jaws 22. As the tongues 32 slide within the grooves 33 it will be manifest that the shoe 29 is free to move upwardly on the jaws 22, exerting a constricting or contracting action on the jaws so as to swing them to closed or holding position in respect to the object to be recovered. Such upward movement of the shoe is effected by rotating the stem 15, the threads 31 producing an upward feeding of the shoe as will be understood. The shoe is limited in its upward movement by a sharp angled shoulder 34 at the upper edge of the frusto-conical portion abutting sharp angled shoulders 34ª on the upper ends of the jaws 22. These shoulders 34 and 34ª also serve to produce a compact unit when the tool is in open position, yet holding the jaws open and preventing looseness or dangling thereof and downward movement of the shoe on the stem while the tool is being lowered into the hole. This is important because it is impossible to lower a string of drill pipe or any other pipe into a hole without repeated forward and backward rotation thereof which in a great many instances results in closing of the jaws.

In practice, the fishing tool is adapted to be associated with the lower end of a rotary drill pipe in the manner previously described, the shoe 29 occupying the upper position shown in Fig. 1, in which the jaws 22 are held in open position. By lowering the drill within the well to the bottom thereof or to any desired point for fishing out any small obstructions or small, broken, or other parts of lost tools, the jaws 22 of the grab device pass about the object to be recovered.

When the jaws come in contact with the bottom of the hole they are held against rotating by such contact. This holding is transmitted to the shoe 29 through the tongues 32 so that by now rotating the stem 16 through the medium of the drill pipe and in the direction of the arrow (Fig. 2), the threads 31 will operate to feed the shoe 29 downwardly on the stem to the position shown in Fig. 2, whereby the jaws 22 are swung inwardly to a closed or holding position thereby effectively gripping the object to be recovered. It will thus be understood that with subsequent lifting of the drill pipe from the well, the fishing tool will continue to hold the object so that its removal and recovery may be effected.

It is important to note that by reason of the particular formation of the jaws 22 the weight of the drill pipe as imposed on the upper ends of the jaws tends to force them open or outward so their positive opening is insured when the shoe 29 is in elevated position. As rotation of the drill pipe extends no further down than to the socket 20, turning the drill pipe first in one direction and then the other will slide the shoe upwardly and then downwardly, and when the tool is within a well and the jaws against the bottom thereof, it will be clear that by such turning operation of the drill pipe the jaws may be caused to perform a sort of digging action in and around any article that might be buried in the bottom of the well, thereby effecting a secure gripping.

In Fig. 5, I have shown a modified means of operatively connecting the shoe 29 with the jaws 22 manually for the purpose of illustrating that various means may be resorted to without departing from the spirit of my invention. The means in this instance comprises the formation of tongues 35 on the jaws 22 to slide within grooves 36 of the shoe 29. Further, I do not wish to be restricted or limited to the number of jaws employed or to the precise construction thereof, as it will be understood that any number and construction of jaws may be employed to suit the size and form of the objects to be recovered.

Although I have herein shown and described only one form of fishing tool embodying my invention, it is to be understood that various changes and modifications may be made herein without departing from the spirit of the invention and the spirit and scope of the appended claims.

I claim:

1. A fishing tool comprising a stem, a socket member on the stem, jaws having head sections seated within the socket member and supporting the jaws for movement to occupy open and closed positions, and a shoe movable on the stem to move the jaws to closed and open positions.

2. A fishing tool comprising a stem, a socket member on the stem, jaws having head members seated in the socket member to permit the jaws to occupy open and closed positions and to allow rotation of the stem independently of the jaws, a shoe threaded on the stem to occupy either of two extreme positions according as the stem is rotated in one direction or the other, said shoe housing the jaws when in one extreme position and exposing the latter when in the other extreme position, and a connection between the jaws and shoe for moving the jaws to open and closed positions according as the shoe is moved to one extreme position and then the other.

3. A fishing tool as embodied in claim 2 wherein said connection comprises tongues secured in the shoe and grooves in the jaws.

4. A fishing tool as embodied in claim 2 wherein said connection comprises tongues on the jaws and grooves in the shoe receiving said tongues.

5. A fishing tool comprising a split bushing adapted to be secured to a stem and having a socket, a pair of jaws having head sections thereon seated in said socket for rotation therein and provided with faces to permit hinged movement of the jaws to occupy open and closed positions, and an actuating shoe threaded on the stem and operable to move the jaws to closed and open positions.

6. A fishing tool comprising a stem, a socket member on the stem, jaws having head members seated in the socket member to permit the jaws to occupy open and closed positions and to allow rotation of the stem independently of the jaws, and a shoe threaded on the stem to occupy either of two extreme positions according as the stem is rotated in one direction or the other, said shoe housing the jaws when in one extreme position and exposing the latter when in the other extreme position.

7. A fishing tool comprising a stem, a socket member on the stem, jaws having head members seated in the socket member to permit the jaws to occupy open and closed positions and to allow rotation of stem independently of the jaws, and a shoe threaded on the stem for moving the jaws to closed and open positions.

8. A fishing tool comprising a split bushing adapted to be secured to a stem and having a socket, a pair of jaws having head sections thereon seated in said socket for rotation therein and provided with faces to permit hinged movement of the jaws to occupy open and closed positions, and means on the stem operable to move the jaws to closed and open positions.

9. A fishing tool comprising a stem, jaws mounted on the stem for rotating movement independently of the stem and to occupy open and closed positions, a member mounted on the stem to occupy either of two extreme positions, and a connection between the jaws and member for positively moving the jaws to open and closed positions according as the shoe is moved to one extreme position and then the other.

10. In a fishing tool, a split bushing adapted to be secured to a stem and having a socket therein, and a pair of jaws having head sections thereon seated in said socket for rotation therein and provided with faces to permit movement of the jaws to occupy open and closed positions.

11. As an article of manufacture, a pair of jaws for use in fishing tools, each of which is of substantially semi-circular form with the concave sides in confronting relation and provided with upwardly extending teeth, said jaws increasing in thickness toward the lower ends and having head sections at the upper ends and having members at the upper ends coacting to provide a substantially spherical head.

12. An article of manufacture as embodied in claim 11 wherein said members are provided at the confronting sides with angular faces to allow rocking movement of one member on the other to permit opening and closing movement of the jaws.

13. A fishing tool comprising a stem, jaws pivoted on the stem to occupy open and closed positions, a shoe mounted on the stem for movement to one extreme position in which the jaws are free to occupy open position, and to another extreme position in which the jaws are moved to closed position, and means on the jaws and shoe coacting when the jaws are in open position to rigidly hold the latter in such position against dangling and to maintain the shoe against downward movement on the stem when the tool is being lowered into a hole.

Signed at Bakersfield in the county of Kern and State of California this 27th day of September, 1928.

GOVENOR K. BECKETT.